(12) United States Patent
Lu (10) Patent No.: US 11,301,181 B2
(45) Date of Patent: Apr. 12, 2022

(54) DIAGNOSING AN IMAGE FORMING APPARATUS BASED ON SOUND SIGNAL ANALYSIS

(71) Applicant: KYOCERA Document Solutions Inc., Osaka (JP)

(72) Inventor: Lin Lu, Osaka (JP)

(73) Assignee: KYOCERA Document Solutions Inc., Osaka (JP)

(*) Notice: Subject to any disclaimer, the term of this patent is extended or adjusted under 35 U.S.C. 154(b) by 0 days.

(21) Appl. No.: 17/220,645

(22) Filed: Apr. 1, 2021

(65) Prior Publication Data

US 2021/0311670 A1 Oct. 7, 2021

(30) Foreign Application Priority Data

Apr. 2, 2020 (JP) .............................. JP2020-067033

(51) Int. Cl.
| | |
|---|---|
| *H04N 1/00* | (2006.01) |
| *G06F 3/12* | (2006.01) |
| *G10L 25/51* | (2013.01) |

(52) U.S. Cl.
CPC ............ *G06F 3/121* (2013.01); *G06F 3/1234* (2013.01); *G10L 25/51* (2013.01); *H04N 1/00029* (2013.01); *H04N 1/00037* (2013.01); *H04N 1/00039* (2013.01); *H04N 1/00074* (2013.01); *H04N 1/00413* (2013.01)

(58) Field of Classification Search
None
See application file for complete search history.

(56) References Cited

U.S. PATENT DOCUMENTS

| | | | |
|---|---|---|---|
| 10,362,180 B2* | 7/2019 | Miyamori | .......... H04N 1/00244 |
| 2007/0070456 A1* | 3/2007 | Nishimura | ......... H04N 1/00002 |
| | | | 358/504 |

(Continued)

FOREIGN PATENT DOCUMENTS

| | | |
|---|---|---|
| AU | 2016378005 A1 | 5/2018 |
| JP | 2012-145806 A | 8/2012 |
| JP | 2017-122664 A | 7/2017 |

(Continued)

*Primary Examiner* — Eric A. Rust
(74) *Attorney, Agent, or Firm* — IP Business Solutions, LLC (57) ABSTRACT

An electronic apparatus includes a sound collecting device, a storage device, a display device, and a control device. The storage device contains a normal spectrogram representing the operation sound of each of functional units, acquired when low-speed operation is normally performed, and a timing chart indicating a timing that each functional unit operates when the electronic apparatus performs the low-speed operation. The control device analyzes frequency of the sound data collected by the sound collecting device when the electronic apparatus performs the low-speed operation, and outputs the spectrogram, decides whether abnormal noise has occurred, by comparison between the outputted spectrogram and the normal spectrogram, identifies, upon deciding that abnormal noise has occurred, the functional unit that is a source of the abnormal noise, by comparison between the timing chart and the outputted spectrogram, and causes the display device to display a first screen indicating the identified functional unit.

8 Claims, 12 Drawing Sheets

(56) References Cited

U.S. PATENT DOCUMENTS

2012/0183313 A1 7/2012 Kurimoto et al.
2017/0201824 A1 7/2017 Okamoto et al.

FOREIGN PATENT DOCUMENTS

| JP | 2018-051983 A | 4/2018 |
| JP | 2019-158661 A | 9/2019 |
| WO | 2017/094270 A1 | 6/2017 |
| WO | 2017/110111 A1 | 6/2017 |
| WO | 2017/115475 A1 | 7/2017 |

\* cited by examiner

DIAGNOSING AN IMAGE FORMING APPARATUS BASED ON SOUND SIGNAL ANALYSIS

INCORPORATION BY REFERENCE

This application claims priority to Japanese Patent Application No. 2020-067033 filed on Apr. 2, 2020, the entire contents of which are incorporated by reference herein.

BACKGROUND

The present disclosure relates to an electronic apparatus and an image forming apparatus, and in particular to a technique to collect the operation sound of functional units constituting the apparatus, to thereby diagnose whether the functional units are normally working.

A technique to collect operation sound of an image forming apparatus, to detect malfunction thereof, has been widely known.

The known techniques for facilitating the cause of abnormal noise to be identified include, for example, displaying an analysis result obtained through frequency analysis of sound information acquired, an analysis result selected according to the position where the sound information is acquired, or information associated with the selected analysis result, on a display device.

In addition, the known techniques for facilitating the comparison of the analysis result include, for example, displaying in parallel a first analysis result obtained through the frequency analysis of the acquired sound information, and a second analysis result obtained through the frequency analysis of the sound information about the abnormal noise, and change the displayed content of either result in a time axis direction.

Further, a diagnosis device is known in which a warning device outputs an alarm sound notifying that a recorder has started recording, but the outputted alarm sound is deleted when data for the diagnosis is generated.

To predict occurrence of abnormality, some image forming apparatuses are configured to drive an image carrier, at a timing and linear velocity different from those in the actual image forming operation, and predict the occurrence of abnormal noise in the image forming operation, according to the sound detected by a sound detector.

Further, some mobile devices are configured to confirm whether the image forming apparatus has successfully completed a task, on the basis of recorded data indicating the waveform of sound wave inputted to a microphone, according to the electric signal outputted from the microphone, and sound information to be used to decide whether the task has been successfully completed.

To guide the recording position, some terminal devices are configured to output information about the position of a sound detector with respect to the device.

Still further, an abnormality decision device, configured to compare an analysis result of the data of collected sound data. with sound profile data stored in a storage device and representing an abnormal situation, to thereby decide whether an functional unit is malfunctioning.

SUMMARY

The disclosure proposes further improvement of the foregoing techniques.

In an aspect, the disclosure provides an electronic apparatus including a sound collecting device, a storage device, a display device, and a control device. The sound collecting device collects operation sound of a plurality of functional units constituting the electronic apparatus, and converts the collected sound into sound data. The storage device contains a spectrogram representing the operation sound of each of the functional units, as normal spectrogram, acquired when low-speed operation in which the functional units each sequentially operate at a predetermined time interval is normally performed, and a timing chart indicating a time point that each of the functional units operates when the electronic apparatus performs the low-speed operation. The control device includes a processor, and acts as a frequency analyzer, an abnormality decider, and a controller, when the processor executes a control program. The frequency analyzer analyzes frequency of the sound data collected by the sound collecting device when the electronic apparatus performs the low-speed operation, and outputs the spectrogram. The abnormality decider decides whether abnormal noise has occurred, by comparison between the spectrogram outputted by the frequency analyzer and the normal spectrogram, and identifies, upon deciding that abnormal noise has occurred, the functional unit that is a source of the abnormal noise, by comparison between the timing chart and the spectrogram outputted by the frequency analyzer. The controller causes the display device to display a first screen indicating the functional unit identified by the abnormality decider.

In another aspect, the disclosure provides an image forming apparatus including the foregoing electronic apparatus, and an image forming device. The image forming device forms an image on a recording medium.

DETAILED DESCRIPTION

Figure 1:
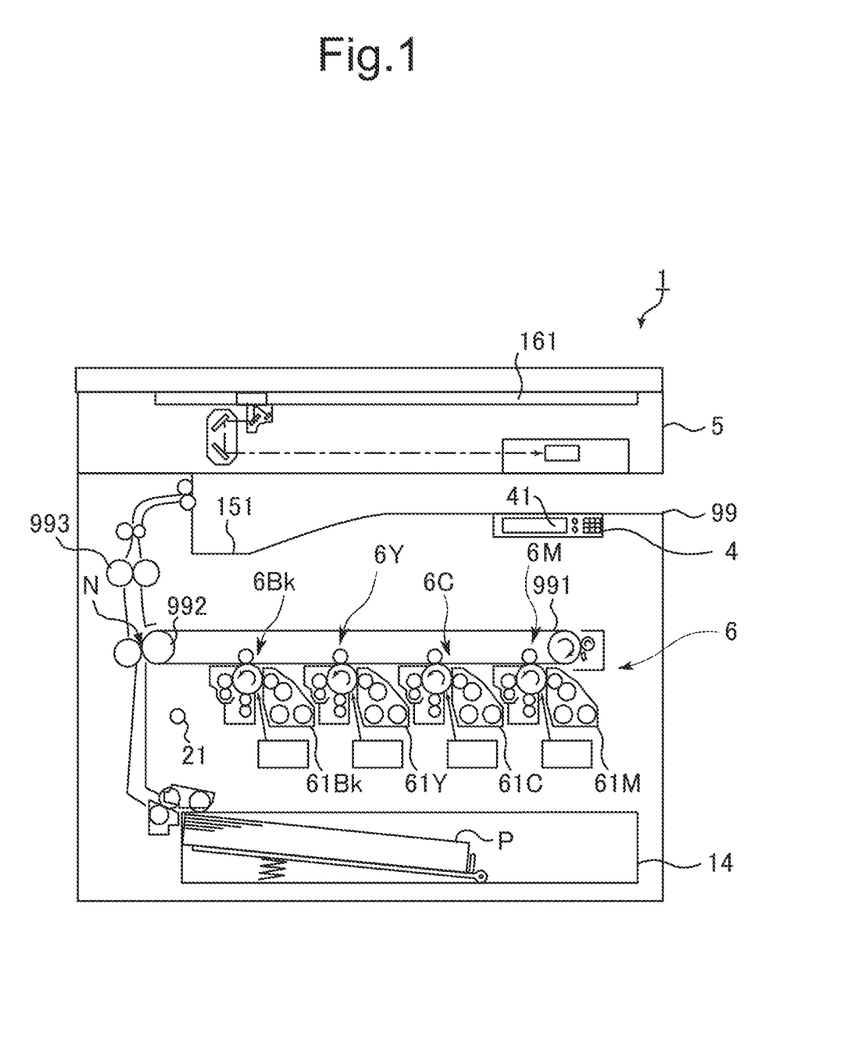
FIG. 1 is a front cross-sectional view showing a structure of an image forming apparatus.

Hereafter, an embodiment of an image forming apparatus, including an electronic apparatus according to the disclosure, will be described with reference to the drawings. In this embodiment, an image forming apparatus based on color electrophotography is taken up as the example of the image forming apparatus. However, the image forming apparatus may be, for example, a monochrome image forming apparatus, or a color ink jet image forming apparatus that requires color adjustment. FIG. 1 is a front cross-sectional view showing a structure of the image forming apparatus 1 according to this embodiment.

The image forming apparatus 1 includes an operation device 4, a reading device 5, an image forming device 6, a paper feeding device 14, and a directional microphone 21, which are provided inside a main body 99.

When the image forming apparatus 1 performs scanning operation, the reading device 5 optically reads the image of a source document placed on a platen glass 161, and generates image data.

When the image forming apparatus 1 performs printing operation, the image forming device 6 forms a toner image on a sheet P delivered from the paper feeding device 14, according to the image data generated by the reading device 5.

When the image forming apparatus 1 performs color printing, an image forming unit 6M for magenta, an image forming unit 6C for cyan, an image forming unit 6Y for yellow, and an image forming unit 6Bk for black in the image forming device 6 each form a toner image on a photoconductor drum, on the basis of the image formed of the corresponding color component, through charging, exposing, and developing processes, and such toner image is transferred onto an intermediate transfer belt 991 via a primary transfer roller.

A cartridge 61M contains the toner of magenta, a cartridge 61C contains the toner of cyan, a cartridge 61Y contains the toner of yellow, and a cartridge 61Bk contains the toner of black. These cartridges are removably mounted in the main body 99. When the toner in the cartridge runs out, a user or a maintenance staff replaces the empty cartridge with a new one.

The toner images of the respective colors are superposed at an adjusted timing when transferred onto the intermediate transfer belt 991, so as to form a colored toner image. A secondary transfer roller 992 transfers the colored toner image formed on the surface of the intermediate transfer belt 991 onto the sheet P transported from the paper feeding device 14, at a nip region N.

Then a fixing device 993 fixes the toner image on the sheet P by heat-pressing. The sheet P having the colored image formed and fixed thereon is discharged to an output tray 151. The paper feeding device 14 accommodates therein the sheets P.

The directional microphone 21 serves to collect the sound generated inside the image forming apparatus 1, and corresponds to the sound collecting device in the disclosure. The mounting position of the directional microphone 21 is not limited to the position shown in FIG. 1.

The type of the directional microphone 21 is not specifically limited, provided that the microphone is capable of collecting sound, converting the sound into an electric signal, and outputting sound data. It is preferable that the directional microphone 21 is small in size, to be mounted inside the image forming apparatus 1.

Figure 2:
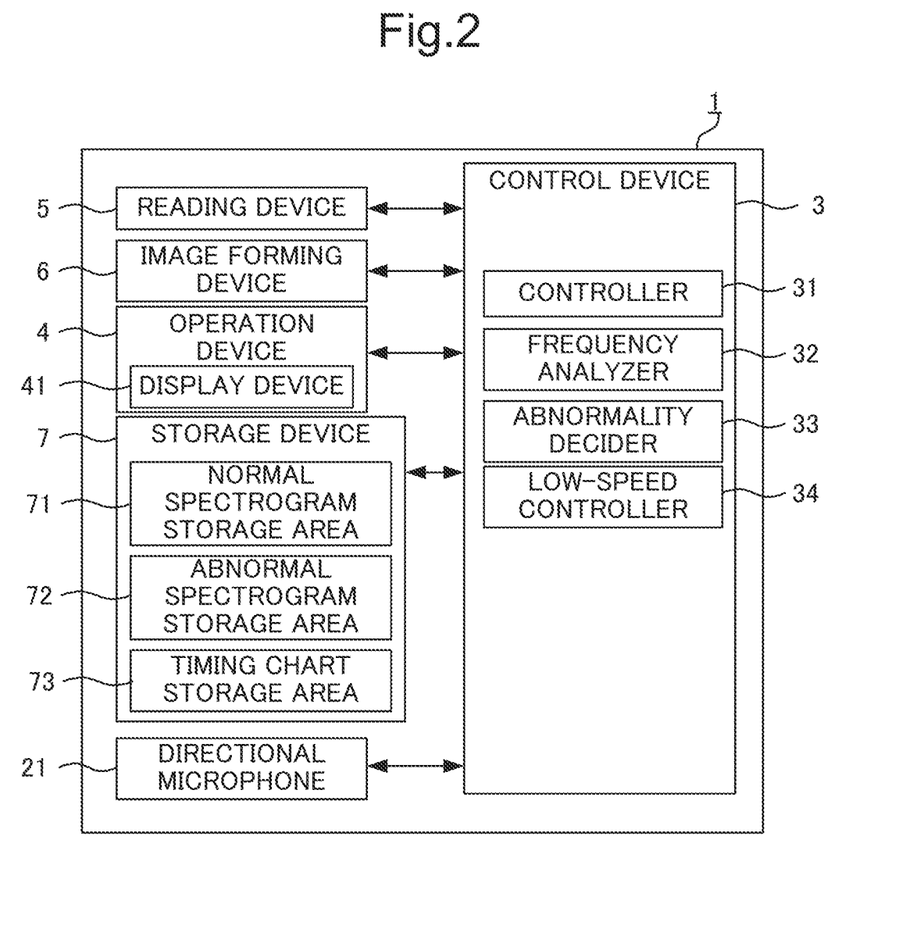
FIG. 2 is a functional block diagram showing an essential internal configuration of the image forming apparatus.

FIG. 2 is a functional block diagram showing an essential internal configuration of the image forming apparatus. The image forming apparatus 1 includes a control device 3, the reading device 5, the image forming device 6, the operation device 4, a storage device 7, and the directional microphone 21.

The reading device 5 is, for example, a scanner that optically reads the image of a source document, and generates the image data. The image forming device 6 prints the image on a sheet, according to the image data generated by the reading device 5.

The operation device 4 includes, for example, menu keys for selecting a menu, an enter key for confirming an operation or setting, and a start key. The operation device 4 is used by the user to input an instruction. The display device 41 is constituted of a liquid crystal display (LCD), an organic light-emitting diode (OLED) display, or the like, and displays a message or an operation screen, to the user.

The storage device 7 is, for example, a memory, a solid state drive (SSD), or a hard disk drive (HDD), and contains data and programs necessary for the operation of the image forming apparatus 1. The storage device 7 includes storage areas such as a normal spectrogram storage area 71, an abnormal spectrogram storage area 72, and a timing chart storage area 73.

The normal spectrogram storage area 71 is for storing a normal spectrogram, which is the spectrogram (graph indicating frequency and intensity of signal components, along a time axis) representing the operation sound of each of functional units constituting the image forming apparatus 1, acquired when the image forming apparatus 1 normally performs low-speed operation, in which the functional units sequentially operate at a predetermined time interval. The spectrogram can be acquired, for example, through continuous wavelet transform (CWT) performed by the frequency analyzer 32, with respect to the sound data representing the operation sound of the image forming apparatus 1.

Although the frequency analyzer 32 performs the CWT to analyze the sound data in this embodiment, other analysis methods may be employed, provided that the frequency analysis of the sound data is performed along the time axis direction.

The normal spectrogram stored in the normal spectrogram storage area 71 may be installed in advance, when the apparatus is shipped from the plant. Alternatively, the normal spectrogram may be obtained by causing the image forming apparatus 1 to perform test printing at a low speed, immediately after the image forming apparatus 1 installed, collecting the sound generated inside the apparatus with the directional microphone 21 and outputting the sound data, and causing the frequency analyzer 32 to perform the frequency analysis, and the normal spectrogram thus obtained may be stored in the normal spectrogram storage area 71.

In the abnormal spectrogram storage area 72, the spectrogram outputted by the frequency analyzer 32, when the abnormality decider to be subsequently described has decided that the image forming apparatus 1 is abnormally operating, is stored as the abnormal noise spectrogram.

Figure 3:
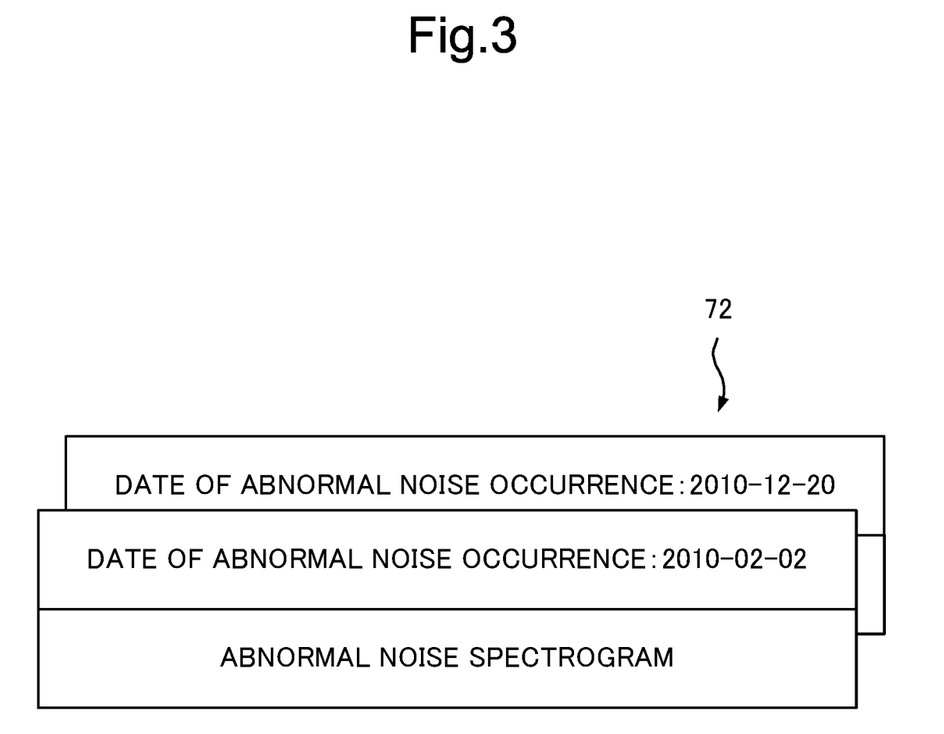
FIG. 3 is a schematic drawing showing a data structure in an abnormal spectrogram storage area.

FIG. 3 is a schematic drawing showing a data structure in the abnormal spectrogram storage area 72. In the abnormal spectrogram storage area 72, the date that the abnormal noise occurred (Date of Abnormal Noise Occurrence) and the abnormal noise spectrogram are stored, in association with each other.

In the timing chart storage area 73, the timing chart indicating the time point that each of the functional units is activated, when the image forming apparatus 1 performs the low-speed operation.

The control device 3 includes a processor, a random-access memory (RAM), a read-only memory (ROM), and so forth. The processor is, for example, a central processing unit (CPU), a micro processing unit (MPU), an application specific integrated circuit (ASIC), or the like. The control device 3 acts as a controller 31, the frequency analyzer 32, the abnormality decider 33, and a low-speed controller 34, when the processor executes a control program, for example stored in the ROM. Here, the mentioned components of the control device 3 may each be constituted in the form of a hardware circuit, instead of being realized according to the program.

The controller 31 serves to control the overall operation of the image forming apparatus 1. The controller 31 controls the displaying operation of the display device 41. The frequency analyzer 32 analyzes the frequency of the sound data outputted by the directional microphone 21, and outputs the spectrogram. More specifically, the frequency analyzer 32 performs the CWT of the sound data, and generates the spectrogram.

The abnormality decider 33 compares the spectrogram outputted by the frequency analyzer 32 with the normal spectrogram stored in the normal spectrogram storage area 71, and decides whether these spectrograms are different from each other. When the difference between the two spectrograms is equal to or larger than a predetermined first value, it is presumable that an abnormal noise has occurred, and therefore the abnormality decider 33 decides that the image forming apparatus 1 is abnormally operating.

The abnormality decider 33 also extracts, from the two spectrograms, the time point that the difference equal to or larger than the predetermined first value has appeared, and identifies the functional unit that is likely to be the source of the abnormal noise, utilizing the timing chart stored in the timing chart storage area 73. The method of deciding whether abnormality has occurred, and identifying the functional unit that is the source of the abnormal noise, employed by the abnormality decider 33, will be subsequently described in further detail.

The low-speed controller 34 controls the image forming apparatus 1 so as to perform the low-speed operation.

Figure 4:
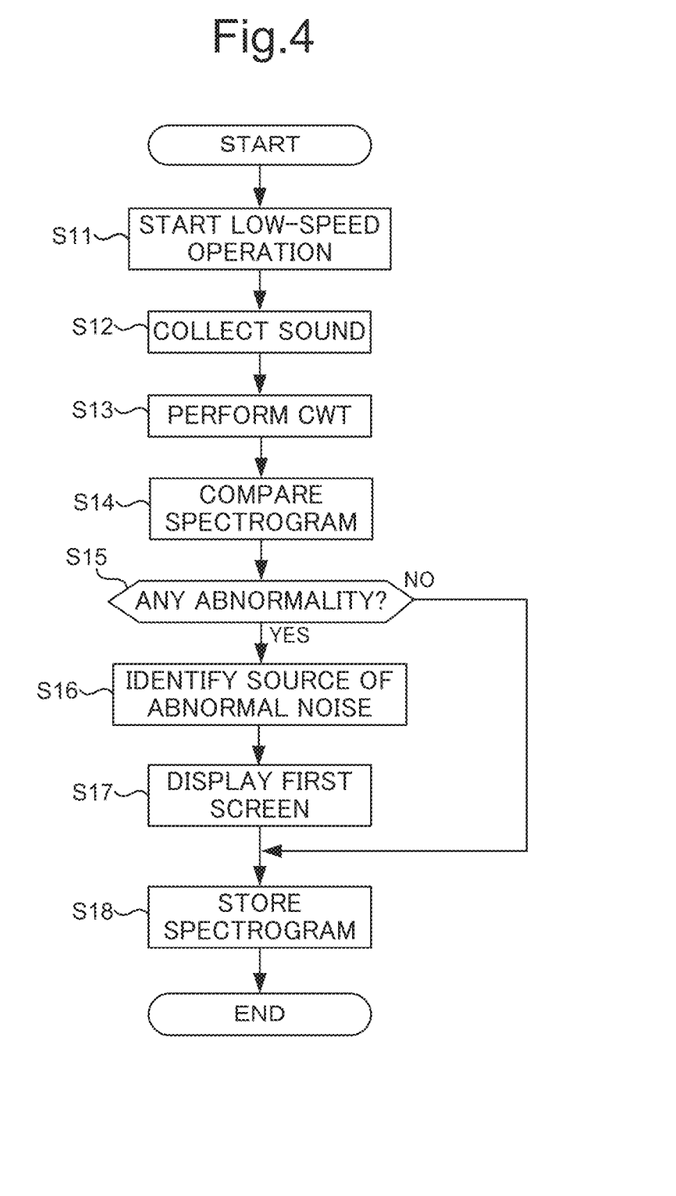
FIG. 4 is a flowchart showing an abnormal noise diagnosis process.

FIG. 4 is a flowchart showing the process of abnormal noise diagnosis, according to this embodiment. The controller 31 performs the abnormal noise diagnosis, by executing an abnormal noise diagnosis program. The controller 31 may execute the abnormal noise diagnosis program at predetermined time intervals, or when an instruction to execute the abnormal noise diagnosis program is inputted by a maintenance staff, through the operation device 4.

First, the low-speed controller 34 causes the image forming apparatus 1 to perform test printing at a low speed, for the purpose of the abnormal noise diagnosis (step S11). The low-speed controller 34 causes the image forming apparatus 1 to perform the low-speed operation, when the image forming apparatus 1 is not performing a printing job (e.g., in a standby mode).

The directional microphone 21 starts to collect sound (step S12), and the frequency analyzer 32 performs the CWT of the sound data outputted by the directional microphone 21, thereby outputting the spectrogram (step S13). The abnormality decider 33 decides whether abnormality has occurred, by comparison between the spectrogram outputted by the frequency analyzer 32, and the normal spectrogram stored in the normal spectrogram storage area 71 (step S14).

Figure 5A:
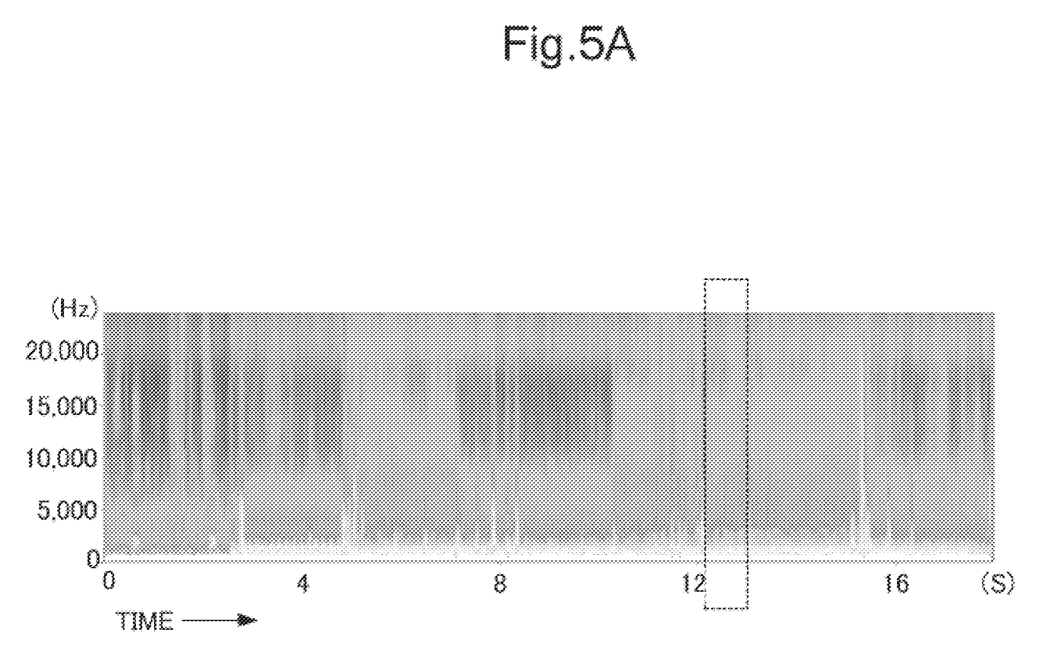
FIG. 5A is a graph showing an example of a normal spectrogram.
Figure 5B:
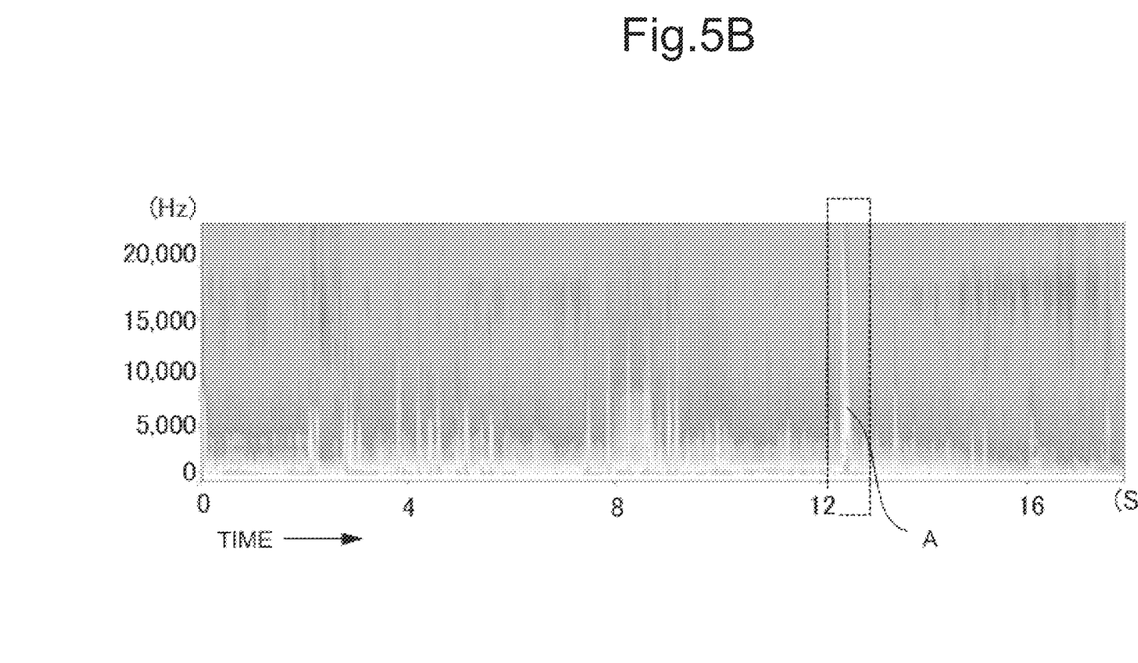
FIG. 5B is a graph showing an example of a spectrogram outputted by a frequency analyzer.

FIG. 5A illustrates an example of the normal spectrogram. FIG. 5B illustrates an example of the spectrogram outputted by the frequency analyzer 32. For example, focusing on the time point surrounded by a dotted-line frame, while no waveform is seen at this time point in the normal spectrogram shown in FIG. 5A, an acute waveform A is seen in the spectrogram outputted by the frequency analyzer 32 shown in FIG. 5B. This means that a noise, which would not be generated when the low-speed operation is normally performed, has been generated. In this case, the abnormality decider 33 decides that abnormality occurred in the operation of the image forming apparatus 1 (YES at step S15).

For example, when, although the normal spectrogram and the spectrogram outputted by the frequency analyzer 32 both present a waveform at the same time point, the difference in height (frequency) between the waveforms is equal to or larger than the predetermined first value, or the difference in sound intensity, indicated by the color of the waveform, between the waveforms is equal to or larger than the predetermined first value, the abnormality decider 33 decides that the sound that would not be generated in the normal situation has been detected, in other words an abnormal noise has been detected, thus deciding that abnormality has occurred in the image forming apparatus 1.

In contrast, when the difference between the normal spectrogram and the spectrogram outputted by the frequency analyzer 32 is small, the abnormality decider 33 decides that there is no abnormality (NO at step S15), and the controller 31 stores the acquired spectrogram in the abnormal spectrogram storage area 72, in association with the date that the spectrogram has been acquired (step S18). At this point, the controller 31 finishes the abnormal noise diagnosis. In this embodiment, the acquired spectrogram is stored in the abnormal spectrogram storage area 72 in association with the acquisition date as described above, so as to allow the abnormality decider 33 to retrospectively decide whether there has been a sign of abnormality. For example, when the difference in frequency or sound intensity, between the waveforms of the same time point in the normal spectrogram and the spectrogram outputted by the spectrogram outputted by the frequency analyzer 32, is smaller than the predetermined first value, but equal to or larger than a predetermined second value smaller than the first value, in other words when, although abnormal noise has been detected, the abnormal noise is not so serious as to decide that abnormality has occurred, the abnormality decider 33 decides that there is a sign of abnormality. Such an arrangement enables the sign of abnormality to be traced, on the basis of the decision made by the abnormality decider 33 according to the spectrogram acquired earlier than the time point that the abnormality has been detected.

Upon deciding that abnormality has occurred in the operation of the image forming apparatus 1 (YES at step S15), the abnormality decider 33 compares the timing chart representing the low-speed operation, stored in the timing chart storage area 73, with the spectrogram outputted by the frequency analyzer 32, thereby identifying the functional unit working at the time point that the abnormal noise has occurred (step S16).

Figure 6:
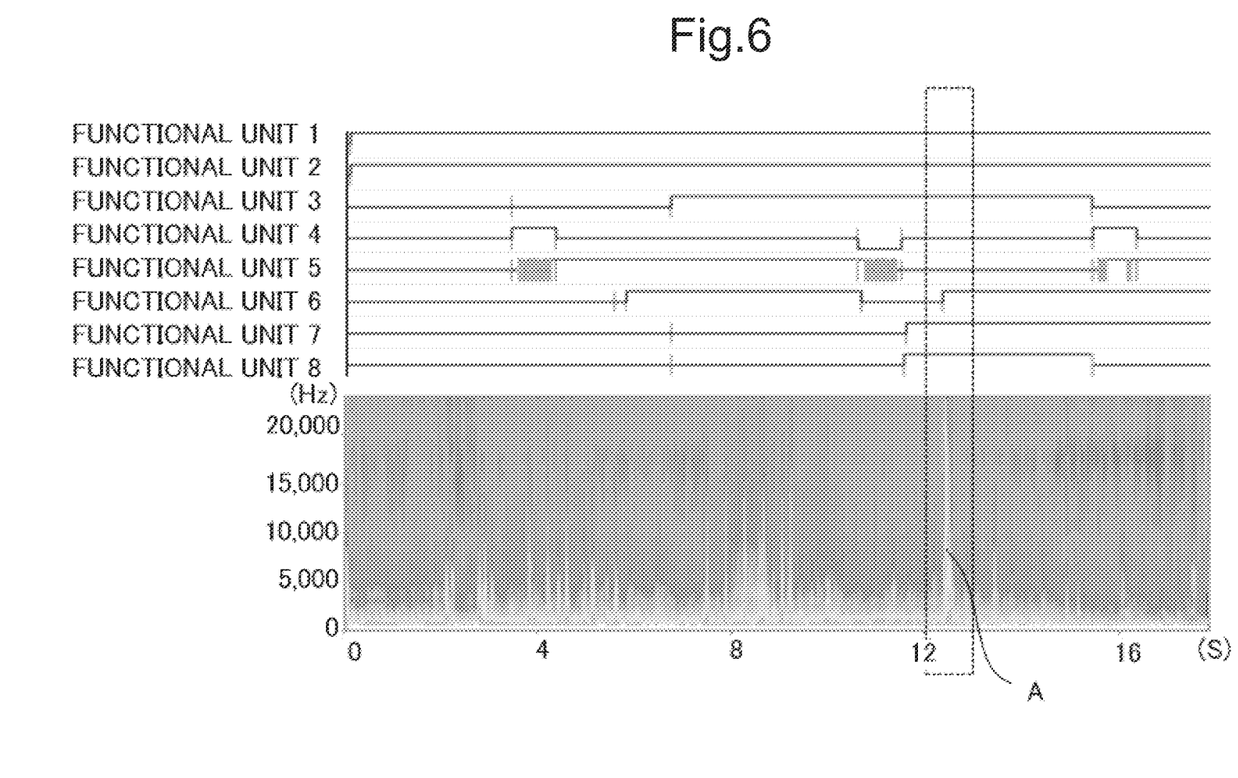
FIG. 6 is a graphic diagram showing an example of timing chart of functional units and the spectrogram.

FIG. 6 illustrates examples of the timing chart of the functional units 1 to 8 constituting the image forming apparatus 1, and the spectrogram. For example, upon deciding that the waveform A is representing the abnormal noise, the abnormality decider 33 looks for an functional unit, the action of which coincides with the time point that the waveform A has appeared. In the case of FIG. 6, the timing chart of the functional unit 6 indicates a rising point that coincides with the time point that the waveform A has appeared. Accordingly, the abnormality decider 33 identifies the functional unit 6 as the source of the abnormal noise.

Figure 7:
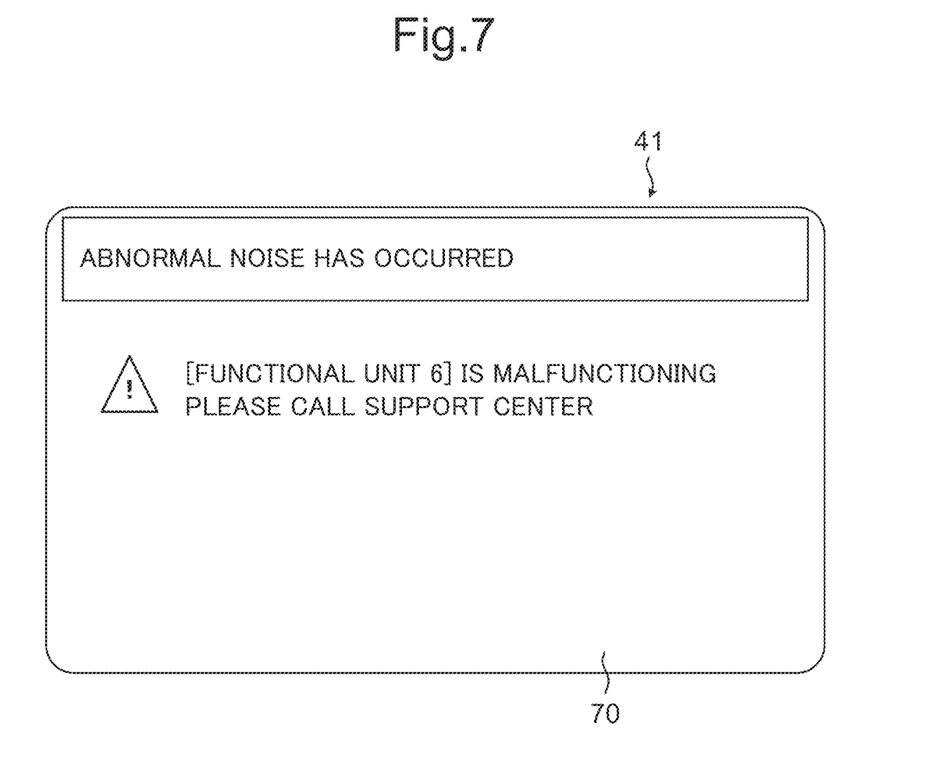
FIG. 7 is a schematic drawing showing an example of a first screen.
Figure 8:
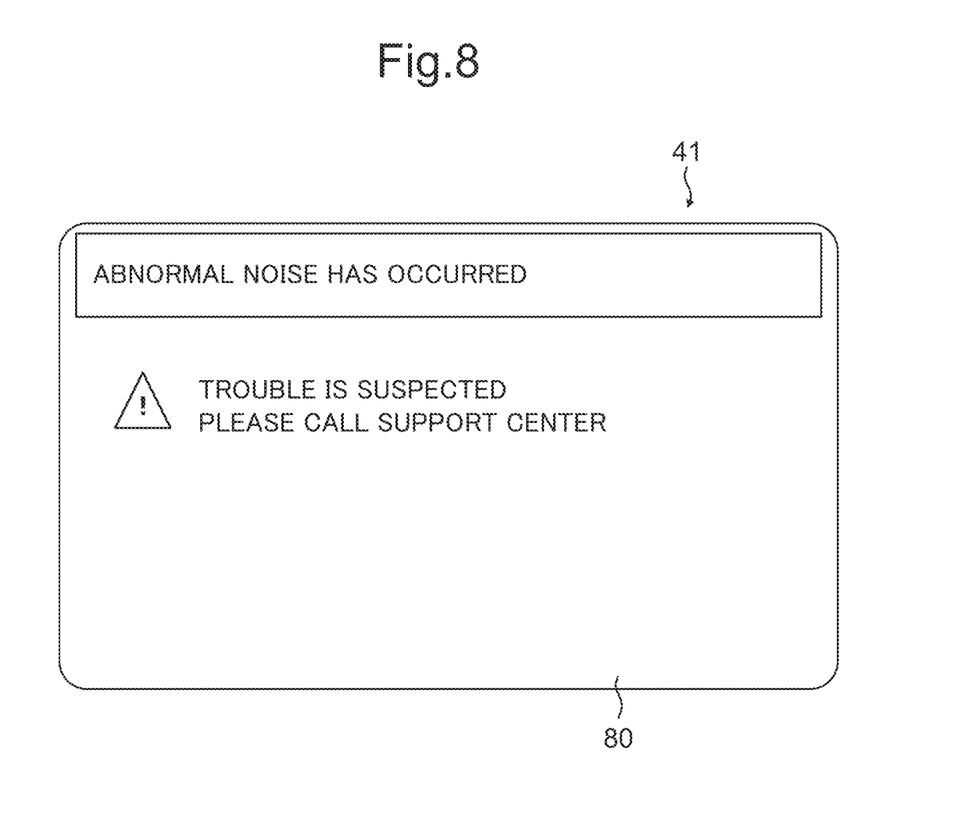
FIG. 8 is a schematic drawing showing an example of a third screen.

The controller 31 causes the display device 41 to display a first screen 70 showing the name of the functional unit identified as the source of the abnormal noise, with a warning message (step S17). FIG. 7 illustrates an example of the first screen 70. In the case where the abnormality decider 33 has failed to identify the source of the abnormal noise, the controller 31 may cause the display device 41 to display a third screen 80 only notifying that abnormality has occurred, as shown in FIG. 8.

Figure 9:
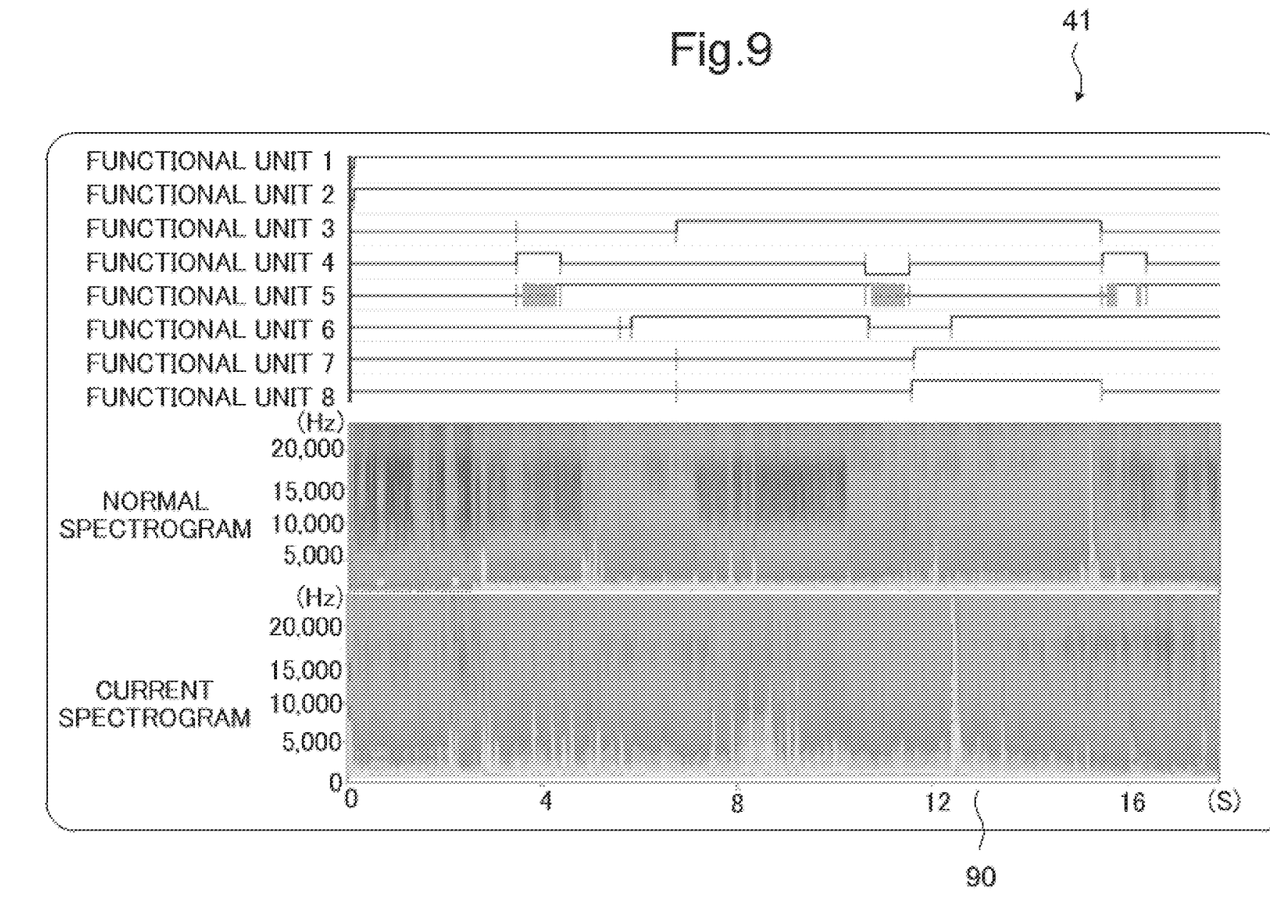
FIG. 9 is a schematic drawing showing an example of a second screen.

Alternatively, when the abnormality decider 33 has decided that abnormality has occurred in the operation of the image forming apparatus 1, the controller 31 may cause the display device 41 to display a second screen 90 showing the timing chart representing the low-speed operation, the normal spectrogram, and the spectrogram outputted by the frequency analyzer 32 at a time, as shown in FIG. 9. In view of the second screen 90, the maintenance staff of the image forming apparatus 1 may directly check, or identify the malfunctioning part. At this point, the controller 31 may move the second screen 90 in a left-right direction or up-down direction, according to an instruction of the user, for example a scrolling operation, inputted through the touch panel provided over the display device 41. Likewise, when the user performs a pinch operation on the touch panel, the controller 31 may cause the display device 41 to display the second screen 90 in an enlarged size. Further, when the user designates a past date through the operation device 4, the controller 31 may retrieve the spectrogram corresponding to the designated date from the abnormal spectrogram storage area 72, and cause the display device 41 to display the spectrogram thus retrieved in the second screen 90, in place of the spectrogram currently outputted by the frequency analyzer 32, irrespective of whether the retrieved spectrogram represents a normal situation or an abnormal situation. In this case, the user can identify the time point that the sign of abnormality appeared, in view of the mentioned display.

Then the controller 31 stores the spectrogram outputted by the frequency analyzer 32 in the abnormal spectrogram storage area 72, in association with the date that this spectrogram has been acquired (step S18). At this point, the operation is finished.

Now, with the aforementioned known techniques, the maintenance staff of the apparatus attempts to identify the part presumed to be the source of the abnormal noise. Therefore, the decision may vary depending on the staff, which may lead to inaccurate detection of the abnormality.

According to the foregoing embodiment, in contrast, whether abnormality has occurred in the operation of the image forming apparatus 1 can be decided, by comparison between the spectrogram obtained by CWT of the operation sound, collected during the current low-speed operation of the image forming apparatus 1, and the normal spectrogram representing the normal low-speed operation. In addition, although some functional units are working at generally the same operation timing during the actual operation, the difference in operation timing becomes more visible in the low-speed operation. Therefore, the comparison between the spectrogram obtained by CWT and the timing chart representing the low-speed operation allows the functional unit that is the source of the abnormal noise to be accurately identified.

In the foregoing embodiment, the abnormality decider 33 decides whether abnormality has occurred in the image forming apparatus 1, and identifies the source of the abnormal noise, upon deciding that abnormality has occurred. However, the abnormality decider 33 may also detect a sign of abnormality, in addition to diagnosing whether abnormality has occurred.

For example, when the difference in frequency of the waveform or sound intensity, between the waveforms observed at the same time point in the normal spectrogram and the spectrogram outputted by the frequency analyzer 32, is smaller than the predetermined first value but equal to or larger than the predetermined second value lower than the first value, in other words when the abnormal noise is not so serious as to decide that abnormality has occurred, the abnormality decider 33 may decide that there is a sign of abnormality.

In such a case also, the abnormality decider 33 identifies the functional unit presenting the sign of abnormality in the same way as above, and the controller 31 causes the display device 41 to display a message indicating the functional unit that is presenting the sign of abnormality. Further, the controller 31 stores the spectrogram outputted by the frequency analyzer 32 in the abnormal spectrogram storage area 72, in association with the current date.

Figure 10:
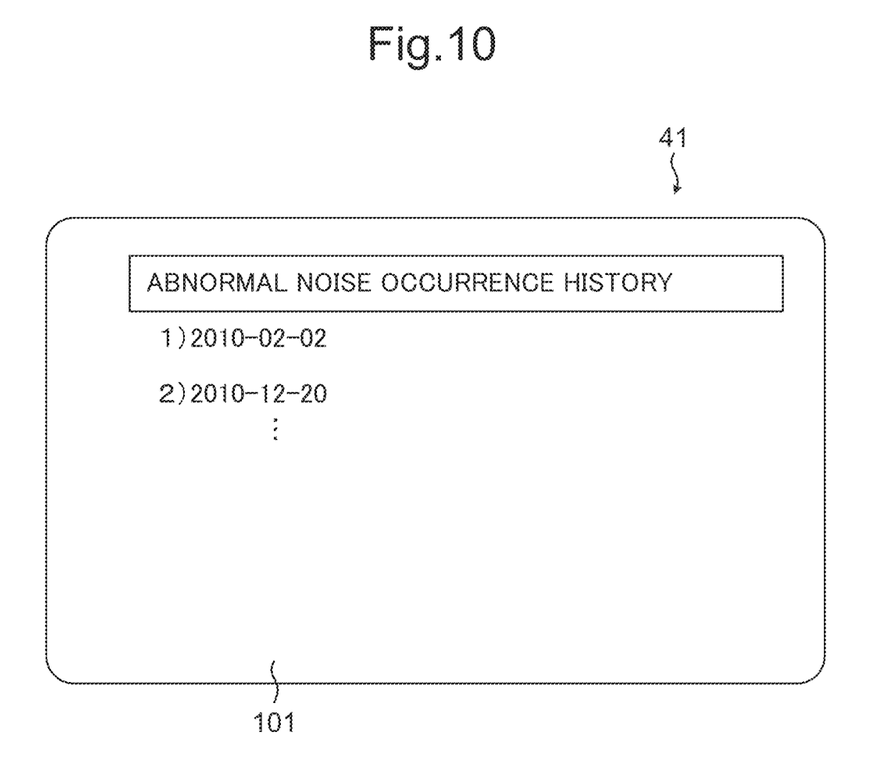
FIG. 10 is a schematic drawing showing an example of an abnormal noise occurrence history.

The controller 31 may also cause the display device 41 to display abnormal noise occurrence history 101 indicating the dates stored in the abnormal spectrogram storage area 72, for example upon receipt of an instruction of a service staff of the image forming apparatus 1, inputted with a predetermined operation through the operation device 4. FIG. 10 illustrates an example of the abnormal noise occurrence history 101.

Figure 11:
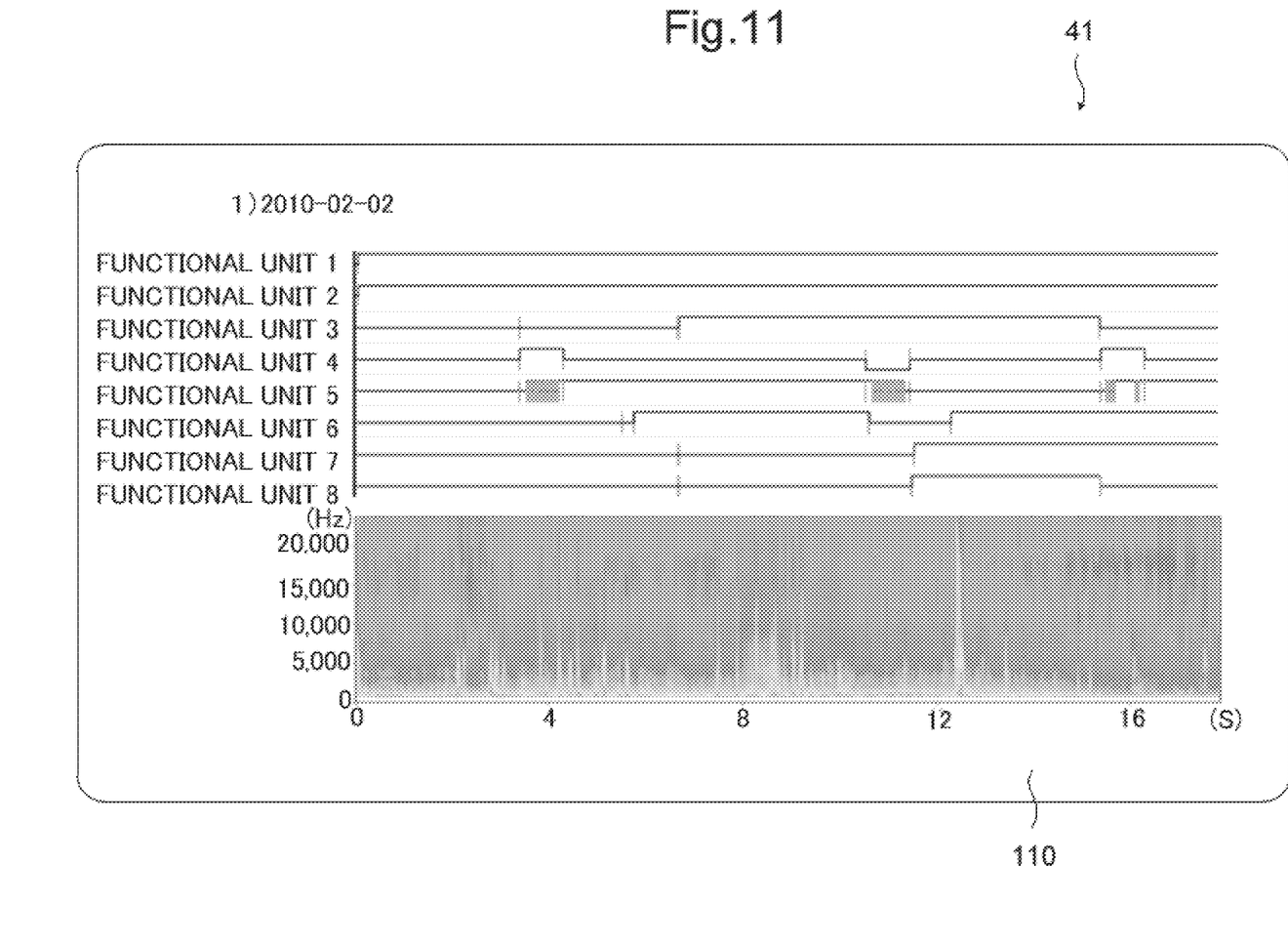
FIG. 11 is a schematic drawing showing an example of a fourth screen.

Further, when the service staff selects one of the dates displayed on the display device 41, for example by a touch on the touch panel provided over the display device 41, the controller 31 may cause the display device 41, upon receipt of the selection, to display a fourth screen 110, showing the timing chart and the abnormal noise spectrogram corresponding to the selected date, retrieved from the abnormal spectrogram storage area 72. FIG. 11 illustrates an example of the fourth screen 110. Displaying thus the abnormal noise spectrogram of the past enables the service staff to confirm the abnormal noise of the past, whenever necessary.

While the present disclosure has been described in detail with reference to the embodiments thereof, it would be apparent to those skilled in the art the various changes and modifications may be made therein within the scope defined by the appended claims.

What is claimed is:

1. An electronic apparatus comprising:
   a sound collecting device that collects operation sound of a plurality of functional units constituting the electronic apparatus, and converts the collected sound into sound data;
   a storage device containing a spectrogram representing the operation sound of each of the functional units, as normal spectrogram, acquired when low-speed operation in which the functional units each sequentially operate at a predetermined time interval is normally performed, and a timing chart indicating a time point that each of the functional units operates when the electronic apparatus performs the low-speed operation;
   a display device; and
   a control device including a processor, and configured to act, when the processor executes a control program, as:
      a frequency analyzer that analyzes frequency of the sound data collected by the sound collecting device when the electronic apparatus performs the low-speed operation, and outputs the spectrogram;
      an abnormality decider that decides whether abnormal noise has occurred, by comparison between the spectrogram outputted by the frequency analyzer and the normal spectrogram, and identifies, upon deciding that abnormal noise has occurred, the functional unit that is a source of the abnormal noise, by comparison between the timing chart and the spectrogram outputted by the frequency analyzer, and a controller that causes the display device to display a first screen indicating the functional unit identified by the abnormality decider.

2. The electronic apparatus according to claim 1,
wherein, when the abnormality decider decides that an abnormal noise has occurred, the controller causes the display device to further display a second screen showing the timing chart, the normal spectrogram, and the spectrogram outputted by the frequency analyzer.

3. The electronic apparatus according to claim 1,
wherein the abnormality decider calculates a difference in frequency or sound intensity detected at a same time point, between the spectrogram outputted by the frequency analyzer and the normal spectrogram, and decides that an abnormal noise has occurred, upon detecting a time point where the difference is equal to or larger than a predetermined first value.

4. The electronic apparatus according to claim 3,
wherein the abnormality decider decides that there is a sign of abnormality, upon detecting a time point where the difference is smaller than the first value, but equal to or larger than a predetermined second value lower than the first value.

5. The electronic apparatus according to claim 4,
wherein, when the abnormality decider decides that an abnormal noise has occurred, or that there is a sign of abnormality, the controller stores the spectrogram outputted by the frequency analyzer, and a date that the spectrogram has been acquired, in the storage device.

6. The electronic apparatus according to claim 5, further comprising an operation device through which an instruction of a user is inputted,
wherein the controller causes the display device to display a list of dates stored in the storage device, as an abnormal noise occurrence history,
retrieves, upon receipt of the instruction for selecting a date through the operation device, the spectrogram corresponding to the date selected according to the instruction, from the storage device, and
causes the display device to display the spectrogram retrieved.

7. The electronic apparatus according to claim 5, further comprising an operation device through which an instruction of a user is inputted,
wherein the controller retrieves, upon receipt of the instruction designating a past date through the operation device, the spectrogram corresponding to the past date designated according to the instruction, from the storage device, and causes the display device to display the spectrogram retrieved, the timing chart, and the normal spectrogram.

8. An image forming apparatus comprising:
the electronic apparatus according to claim 1; and
an image forming device that forms an image on a recording medium.

* * * * *